United States Patent [19]

Hebel, Jr. et al.

[11] 3,736,448
[45] May 29, 1973

[54] DISPLACEMENT TRANSDUCER

[76] Inventors: August G. Hebel, Jr.; August G. Hebel, III, both of 1257 18th Street, Detroit, Mich. 48216

[22] Filed: Nov. 1, 1971

[21] Appl. No.: 194,373

[52] U.S. Cl. ................................. 310/15, 310/30
[51] Int. Cl. ............................................. H02k 35/02
[58] Field of Search .............. 310/15, 25, 30, 14, 310/12; 340/17

[56] References Cited

UNITED STATES PATENTS

| | | | |
|---|---|---|---|
| 3,129,347 | 4/1964 | Tognola | 310/15 |
| 3,633,053 | 1/1972 | Peters | 310/15 |

Primary Examiner—D. F. Duggan
Attorney—Arthur Raisch, John M. Kisselle, Robert A. Choate

[57] ABSTRACT

An electromechanical transducer for developing electrical signal measurements of mechanical vibrations. A magnet is guided for lengthwise movement within a coil whose length is substantially equal to that of the magnet. A high-permeability casing surrounds the coil and serves to concentrate the magnetic flux of the magnet such that the magnet tends to center itself lengthwise of the coil. Upon oscillation of the transducer body on which the coil and the casing are fixedly mounted, the magnet oscillates lengthwise within the coil to develop the electric signal voltage.

2 Claims, 4 Drawing Figures

Patented May 29, 1973  3,736,448

DISPLACEMENT TRANSDUCER

This invention relates to electromechanical transducers and in particular to a displacement transducer for generating an electrical signal in response to movement of an object on which the transducer is mounted. The transducer of the present invention is well suited for providing an electrical measurement of mechanical vibrations.

The objects provided by the transducer of the present invention include: ruggedness of construction thereby rendering the transducer capable of relatively long life in relatively severe applications and permanent adjustment and calibration thereby eliminating periodic readjustment and/or recalibration.

Other objects, features and advantages of the invention will be apparent in the following description and claims wherein the principles of the invention are set forth in the best mode presently contemplated for the practice of the invention which is described more particularly with reference to the attached drawing wherein:

The transducer of the invention comprises a body on which a coil and a magnet are mounted for relative oscillatory movement in response to vibration of the object on which the body is mounted. The coil and the magnet are coaxial and of substantially equal lengths with the magnet being axially slidable lengthwise of the coil within the free space which the coil surrounds. A magnetic flux path is provided externally of the coil such that the magnet, whose lengthwise opposite ends are of opposite magnetic polarity, tends to center itself lengthwise of the coil with its opposite ends being approximately even with the lengthwise ends of the coil. Upon vibration of the object on which the transducer body is mounted, the coil oscillates in a lengthwise direction relative to the magnet with the opposite ends of the magnet moving alternately into and out of the central free space of the coil and thereby inducing a voltage in the coil which is a measurement of the vibrations in the object.

Figure 1:
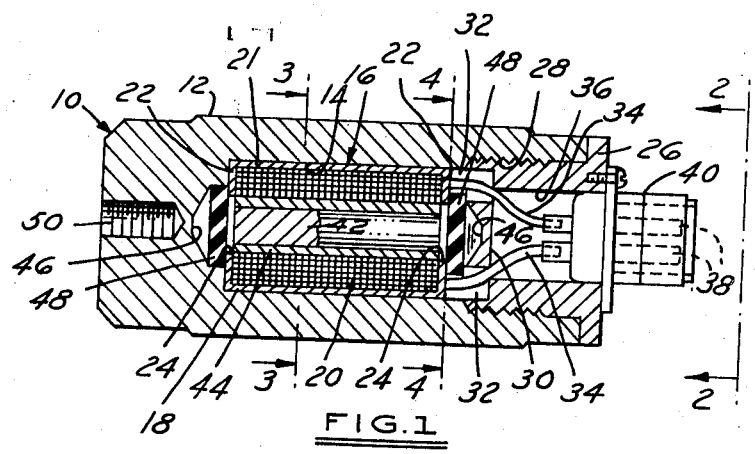
FIG. 1 is a central, longitudinal sectional view through the transducer of the present invention.
Figures 2, 3:
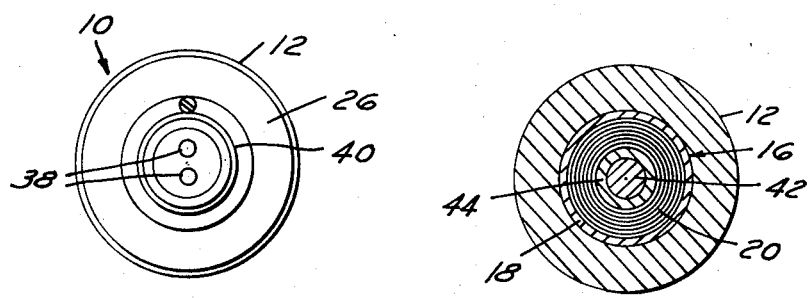
FIG. 2 is an end view of the transducer of FIG. 1 taken along line 2—2 in FIG. 1.
FIG. 3 is a sectional view taken along line 3—3 in FIG. 1.
Figure 4:
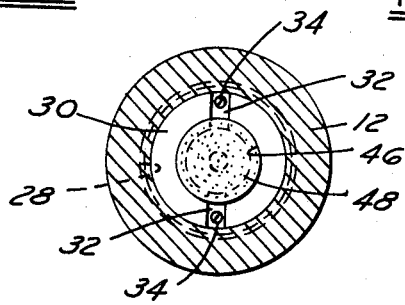
FIG. 4 is a sectional view taken along line 4—4 in FIG. 1.

Turning now to the drawing, the transducer 10 of the present invention shown in FIGS. 1 through 4 comprises a generally cylindrical body 12 having a central circular bore 14 in which a tubular coil and casing unit 16 is fixedly mounted. Unit 16 has an outer steel casing 18 which contains an electric coil 20 formed of a plurality of turns of conductive wire. Casing 18 has a cylindrical side wall 21 which fits within bore 14 and annular end walls 22 having centrally formed circular openings 24. Unit 16 is retained within bore 14 by means of a threaded cap 26 which is screwed into an enlarged threaded portion 28 of bore 14. The inner end of cap 26 interengages a circular spacer 30 with the righthand end wall 22 of casing 18 to thereby firmly retain unit 16 within body 12. A pair of diametrically-opposed notches 32 are provided in the periphery of spacer 30 to permit the lead ends 34 of coil 20 which come through openings in casing 18 to pass through spacer 30 and into a central bore 36 in cap 26. The lead ends 34 are secured to terminals 38 of a connector block 40 which is received within bore 36 and attached to cap 26.

A permanent magnet 42 of cylindrical shape is situated within the central cylindrical free space of coil 20 and is axially slidable lengthwise thereof. A tubular aluminum sleeve 44 of the same length may be pressed onto magnet 42 to provide a close sliding fit of magnet 42 within the free space of coil 20. The openings 24 in end walls 22 of casing 18 are of slightly greater diameter than the outer diameter of sleeve 44 to permit magnet 42 and sleeve 44 to pass therethrough when they oscillate lengthwise of coil 20 in response to vibrations in the object on which the transducer is mounted. Suitable recesses 46 are provided in body 12 and spacer 30 at lengthwise opposite ends of unit 16 to permit the opposite ends of magnet 42 to move axially outwardly of unit 16 through openings 24 when transducer 10 is vibrated. Yieldable rubber bumpers 48 are situated within the portions of recesses 46 adjacent openings 24 to prevent impacting of the ends of magnet 42 and sleeve 44 with the recesses 46 when transducer 10 is severely vibrated. A threaded hole 50 in the left-hand end of body 12 may be utilized for mounting transducer 10 to a vibrating object. To provide maximum response, transducer 10 should be oriented such that the length of coil 20 is parallel to the direction of vibrations.

Magnet 42 is magnetized in the lengthwise direction so that the lengthwise opposite ends thereof are of opposite magnetic polarity. Casing 18 provides a high permeability path for concentrating the external magnetic flux of magnet 42 so that the imaginary magnetic flux lines which extend between the poles of the magnet are concentrated between each end of magnet 42 and the adjacent opening 24 of casing 18. As a result, magnet 42 has a tendency to center itself lengthwise of unit 16 to the position shown in FIG. 1. In this position, the entire flux of magnet 42 theoretically links every turn of coil 20.

With transducer 10 mounted on a vibrating object, coil 20 oscillates lengthwise in unison with the object. The self-centering tendency of magnet 42 within coil 20 tends to move magnet 42 in unison with coil 20. However, the inertia of magnet 42 tends to oppose this force so that as a result, the oscillatory movement of body 12 is imparted to magnet 42 in relatively phased relationship so that magnet 42 oscillates lengthwise relative to coil 20. This relative oscillatory movement causes the ends of magnet 42 to move into and out of their adjacent openings 24. This relative movement changes the flux linking the turns of coil 20 so that a voltage signal is developed across the coil. This voltage signal appears across terminals 38 and may be amplified and monitored by suitable equipment (not shown). For s specific construction of transducer 10, the voltage signal is a function of the amplitude and frequency of the vibrations of the object. Thus, the transducer may be calibrated in terms of amplitude and/or frequency of vibration. Should the vibrations become too severe so that the ends of magnet 42 and sleeve 44 are increasingly displaced from coil 20, bumpers 48 cushion the impact thereof with recesses 46. Bumpers 48 are sufficiently yieldable so as not to interfere with the smaller displacements of magnet 42 which are developed by vibrational amplitudes for which the transducer is intended.

Transducer 10 of the invention is of improved construction over other types of transducers and does not require readjustment or recalibration once it has been initially constructed and calibrated. Because oscillatory motion of magnet 42 is imparted via the magnetic force existing between it and casing 18, no elaborate mechanical connections such as calibrated springs or the like are required. Magnet 42 and casing 18 are constructed such that the magnetic force therebetween, which tends to center magnet 42 lengthwise of coil 20, is of suitable strength relative to the character of vibrations which transducer 10 is to measure. That is, the magnetic force, which is a function of the magnetic flux, the permeability of casing 18 and the dimensions of the spaces between the ends of the magnet and openings 24, must be large enough to prevent impacting of magnet 42 with recesses 46, yet small enough to permit the ends of magnet 42 to move lengthwise of coil 20. Since magnet 42 is to be freely slidable within coil 20, coil 20 is preferably encapsulated in a material which may be centrally bored to provide a relatively smooth surface in which sleeve 44 is slidable with a close sliding fit.

In light of the foregoing description, it is contemplated that modifications to the preferred embodiment may be had, and it is intended to encompass such modifications with the scope of the invention.

We claim:

1. A displacement transducer adapted to be mounted on a vibrating object for generating an electrical signal measurement of vibrations in the object and of the type including a support body, a coil within the body and a magnet axially movable within said coil, that improvement which comprises a body formed with a main cylindrical recess to receive a coil and a smaller recess with a concave end surface at one end of said cylindrical recess, a spacer at the other end of said recess to close said recess and having a recess with a concave end surface coaxial with said first recited smaller recess, a resilient bumper disc in each said coaxial end recesses enclosing said concave surfaces, said magnet lying mechanically unrestrained between said discs and having a length slightly less than the axial distance between said discs.

2. A displacement transducer as defined in claim 1 in which a high permeability magnetic circuit path is formed externally of said coil comprising a cylindrical tube surrounding said coil, and end pieces closing each end of said tube at the end of said coil, each end piece having a central opening adjacent a respective bumper disc, said magnet having a length substantially coextensive with the space between said end pieces and a transverse dimension to permit the ends thereof to pass through said central opening to allow free oscillation between said bumper discs in response to vibrations of said object.

* * * * *